(12) United States Patent
Jaffrey

(10) Patent No.: US 7,150,931 B1
(45) Date of Patent: Dec. 19, 2006

(54) FUEL CELL GAS SEPARATOR

(75) Inventor: Donald Jaffrey, Mount Dandenong (AU)

(73) Assignee: Ceramic Fuel Cells Limited, Victoria (AU)

( * ) Notice: Subject to any disclaimer, the term of this patent is extended or adjusted under 35 U.S.C. 154(b) by 443 days.

(21) Appl. No.: 09/980,956

(22) PCT Filed: Jun. 2, 2000

(86) PCT No.: PCT/AU00/00631

§ 371 (c)(1),
(2), (4) Date: Jun. 25, 2002

(87) PCT Pub. No.: WO00/76015

PCT Pub. Date: Dec. 14, 2000

(30) Foreign Application Priority Data

Jun. 4, 1999 (AU) .................... PQ0788

(51) Int. Cl.
*H01M 8/12* (2006.01)
*H01M 8/02* (2006.01)
(52) U.S. Cl. ......................... 429/30; 429/34
(58) Field of Classification Search .......... 429/30, 429/32, 34, 39
See application file for complete search history.

(56) References Cited

U.S. PATENT DOCUMENTS 4,873,149 A * 10/1989 Shinoda et al. .......... 428/609
5,232,792 A 8/1993 Reznikov
5,858,567 A 1/1999 Spear, Jr. et al.
5,942,349 A * 8/1999 Badwal et al. ............ 429/34

FOREIGN PATENT DOCUMENTS

| CA | 2227216 A1 | 2/1997 |
| CA | 2240270 A1 | 6/1997 |
| DE | 19523637 * | 7/1996 |
| DE | 19523637 A1 | 7/1996 |
| DE | 19547699 A1 | 7/1997 |
| DE | 29807832 U1 | 7/1998 |
| EP | 0955686 A1 | 11/1999 |
| JP | 60-154470 * | 8/1986 |
| JP | 07045291 | 2/1995 |
| JP | 09157001 | 6/1997 |
| JP | 10092446 | 4/1998 |
| WO | WO 96/28855 A1 | 9/1996 |
| WO | WO 97/35349 * | 9/1997 |
| WO | WO 99/13522 * | 3/1999 |

OTHER PUBLICATIONS

Patent Abstracts of Japan, vol. 18, No. 668, Dec. 6, 1994 (JP 06-264193, Sep. 20, 1994, Sumitomo Metal Ind Ltd).

* cited by examiner

*Primary Examiner*—Jonathan Crepeau
(74) *Attorney, Agent, or Firm*—Dorsey & Whitney LLP

(57) ABSTRACT

A fuel cell gas separator member (10) comprises a layer (22) of copper or copper-based alloy having a layer (29) of oxidation-resistant material such as $Al_2O_3$ on the cathode side (30). A protective layer (31) may also be provided on the anode-side (26) of the copper or copper-based alloy layer. The copper-based alloy may be aluminium bronze in which case the oxidation-resistant layer may form automatically. Alternatively, the copper or copper-based alloy layer (22) may be wrapped in a foil (29, 31) of heat resistant steel. Other possibilities are disclosed.

45 Claims, 4 Drawing Sheets

FUEL CELL GAS SEPARATOR

The present invention relates to solid oxide fuel cells and is particularly concerned with gas separators between adjacent fuel cells.

The purpose of a gas separator in planar fuel cell assemblies is to keep the oxygen containing gas supplied to the cathode side of one fuel cell separate from the fuel gas supplied to the anode side of an adjacent fuel cell and to conduct heat generated in the fuel cells away from the fuel cells. The gas separator may also conduct electricity generated in the fuel cells away from the fuel cells, but this function may alternatively be performed by a separate member between each fuel cell and the gas separator.

Sophisticated ceramics for use in fuel cell gas separators have been developed which are electrically conductive, but these suffer from a relatively high fragility, low thermal conductivity and high cost. Special metallic alloys have also been developed, but it has proved difficult to avoid the various materials of the fuel cell assembly and the interfaces between them degrading or changing substantially through the life of the fuel cell, particularly insofar as their electrical conductivity is concerned, because of the tendency of different materials to chemically interact at the high temperatures which are required for efficient operation of a solid oxide fuel cell. For example, most metallic gas separators contain substantial quantities of the element chromium which is used to impart oxidation resistance to the metal as well as other properties.

It has been found that where chromium is present in more than minute quantities it may combine with oxygen or oxygen plus moisture to form highly volatile oxide or oxyhydroxide gases under conditions which are typical of those experienced in operating solid oxide fuel cells. These volatile gases are attracted to the cathode-electrolyte interface where they may react to form compounds which are deleterious to the efficiency of the fuel cell. If these chromium reactions are not eliminated or substantially inhibited, the performance of the fuel cell deteriorates with time to the point where the fuel cell is no longer effective.

Several of these metallic alloys and one proposal for alleviating this problem are described in our patent application WO96/28855 in which a chromium-containing gas separator is provided with an oxide surface layer which reacts with the chromium to form a spinel layer between the substrate and the oxide surface layer and thereby tie in the chromium. However, at present these specialist alloys remain expensive for substantial use in fuel cell assemblies and it would be preferable to have a lower cost alternative.

Special stainless steels have also been developed which are stable at high temperature in the atmospheres concerned, but they generally contain substantial amounts of chromium to provide the desired oxidation resistance and special coatings or treatments are required to prevent the chromium-based gases escaping from a gas separator formed of these steels. Another approach to a heat resistant steel gas separator is described in our patent application WO 99/25890. However, once again, all of these heat resistant steels are specialist materials whose cost will remain high unless substantial amounts can be produced. Furthermore, the thermal and electrical conductivity of heat resistant steels is low relative to many other metals and alloys, for example, 22–24 W/m.K compared to 40–50 W/m.K for the Siemens-Plansee alloy described in WO96/28855. To compensate for this, the thickness of the steel gas separator has to be increased, increasing the mass and cost of a fuel cell stack.

We have now surprisingly found that copper-based gas separators may be successfully utilised in solid oxide fuel cell assemblies without poisoning the anode and the present invention may accordingly provide, in a first aspect, a gas separator member for a fuel cell comprising a layer of solid oxide electrolyte, an anode layer and a cathode layer, the gas separator member having an anode side and a cathode side and comprising a layer of copper or copper-based alloy having a layer of oxidation-resistant material on the cathode side.

Copper has a thermal conductivity which is approximately fourteen times higher than that of typical heat resistant steels, so that considerably less copper may be required to provide a desired heat transfer rate. For example, a heat resistant steel gas separator requiring a 4 mm thickness to achieve the required heat transfer rate may be replaced by a gas separator in accordance with the invention having a copper layer thickness of about 0.3 mm. This combined with the substantially reduced cost of copper over the specialist heat resistant steels can greatly reduce the cost and mass of a solid oxide fuel cell stack.

The layer of copper preferably has a thickness in the range 0.25 mm to 1 mm, more preferably 0.4 mm to 0.7 mm. At thickness less than 0.3 mm, it is unlikely that the copper layer will have sufficient bulk to provide the desired thermal transfer at normal solid oxide fuel cell power densities. However, at lower power densities, thinner copper layers may be adequate, for example 0.1 mm or less. Thickness greater than about 0.7 mm are unnecessary for pure copper. However, the copper may be alloyed with other elements up to a maximum of 50 wt %, preferably up to 20 wt %, in which case a thickness greater than 1 mm, for example up to 4 mm, may be required to provide the desired thermal transfer. Possible alloying elements include Al, Ni, Zn, Sn, Fe, Be, Ag, Au, Mn, Si, P, and Pb, singly or in combinations of two or more.

A major advantage of alloying the copper in the copper layer with aluminium is that it may form the layer of oxidation-resistant material on the cathode side automatically on being exposed to an oxygen containing gas at elevated temperature, for example in use of the fuel cell gas separator, and there is accordingly provided in a second aspect of the invention a gas separator member for a fuel cell comprising a layer of solid oxide electrolyte, an anode layer and a cathode layer, the gas separator member being formed of aluminium bronze.

Aluminium bronze comprises copper with at least 4 wt %, more usually at least 5 wt % Al. The ability of the aluminium bronze to form an oxidation resistant layer of $Al_2O_3$, and therefore the oxidation resistance of the gas separator member, is very much greater at 5 wt % Al than at 4 wt % Al, but does not increase greatly with further increases in aluminium content. Aluminium bronzes have been made with 14 wt % Al, or more, but generally they will have no more than 10 wt % Al. The inclusion of processing aids and other additives such as Fe, Sn and other elements in aluminium bronzes is well known.

The aluminium bronze may be pretreated by heating to at least 650° C., possibly at least 750° C., in air or other oxygen containing gas to form the $Al_2O_3$ layer on the cathode side of the gas separator, but preferably, as noted above, the oxidation resistant layer is formed in use of the gas separator member.

Aluminium bronze is considerably less thermally conductive than pure copper, so that greater thickness than 0.7 mm may be required for the gas separator member, for example up to 2 mm to provide the desired heat transfer at normal power densities.

Alternatively, the layer of oxidation resistant material on the cathode side of the gas separator, or a precursor of said layer, may be applied to the layer of copper or copper-based alloy, or vice versa. Since the prime function of the layer of oxidation-resistant material is to prevent access of the oxygen containing gas on the cathode side of the fuel cell to the copper or copper-based alloy layer, it need not be a thick layer, for example, in the range 50 to 1000 microns, preferably up to 200 microns, more preferably up to 100 microns, depending upon the type of layer. The layer of oxidation-resistant material may take any of a variety of forms, such as a foil which overlies the cathode side of the copper or copper-based alloy, for example is wrapped over or otherwise attached to it to prevent access of the oxygen containing gas, a coating, or a substrate onto which the copper or copper-based alloy layer is coated. The copper or copper-based alloy could be coated onto a substrate layer of oxidation resistant material by sputtering or any other suitable coating technique. The preferred foil or substrate material is heat resistant steel, which may itself be coated with alumina on the cathode side or be a self-aluminising heat resistant steel to prevent chromium gas escaping and poisoning the cathode in use of the gas separator. A self-aluminising heat resistant steel contains at least 4 wt % Al and forms an alumina surface layer on being exposed to an oxidising atmosphere at elevated temperature.

Where the copper or copper-based alloy layer has a coating of the oxidation-resistant material, this or a precursor may be applied by vapour deposition or by any of a variety of known processes. The oxidation resistant layer may itself comprise plural layers to provide the desired properties. Suitable coating materials include Al, $Al_2O_3$ and $ZrO_2$.

In one embodiment, the oxidation resistant material coating may comprise $Al_2O_3$ applied to the layer of copper or copper-based alloy as an alumina coating or as an aluminium coating which is subsequently oxidised. Aluminium may be applied to the copper or alloy surface by a suitable metal spraying technique such as combustion metallising, a low or high velocity oxy-fuel process, an electric arc process, a plasma flame process, by any other vapour deposition process, or even by electro plating or hot dipping. The aluminium coating may then be oxidised to provide the alumina layer, but preferably the aluminium is first permitted to diffuse into the copper or alloy surface layer by reacting it at elevated temperature, preferably above the melting temperature of the aluminium, in a controlled atmosphere of an inert gas, a reducing atmosphere or possibly even an oxidising atmosphere. Diffusion is preferably continued until there is no continuous Al layer on the copper or alloy surface, but with at least 5 wt % Al at the exposed surface which is then oxidised to form a continuous alumina layer.

Copper has a sufficient vapour pressure at the operating temperature of at least 750° C. of a solid oxide fuel cell that copper vapour may contaminate the active surface of the anode layer of the fuel cell. Where the fuel gas is hydrogen, this has proven not to be a major disadvantage so that the copper may remain exposed to the anode layer of the fuel cell. However, the anode layer is commonly of a nickel material and it has been proposed to use the nickel in the anode as a catalyst for reforming methane in the fuel gas to hydrogen. The copper vapour has been found to interfere strongly with this catalytic efficiency of the nickel. Thus, where the fuel gas includes methane and the anode layer includes nickel, it may be necessary to provide a protective layer also on the anode side of the layer of copper or copper-based alloy. Such a protective layer has not been found to be necessary when the copper-based alloy layer is an aluminium bronze as described above since it appears the Cu vapour is prevented from escaping by the alumina layer.

The protective layer on the anode side may comprise heat resistant steel or alumina as described above and, for example, the copper or copper-based alloy layer may be wrapped entirely in the heat resistant steel foil so that only the superior thermal conductivity properties of the copper or alloy are utilised. Again, a heat resistant steel protective layer on the anode side may have a thickness as described above, preferably in the range 50–100 µm. An $Al_2O_3$ protective layer may have a thickness as small as 1–3 µm, but greater thickness as described above may be acceptable.

Alternatively, the protective layer on the anode side may comprise plural layers. In one embodiment a metal barrier layer of any one of W, Ta, or Nb or alloys of one or more of these metals which do not dissolve into the copper may be provided on the copper or copper-based alloy layer, followed by an intermediate layer of Ag plus an outer barrier layer of Ni, a noble metal except Ag or an alloy of one or more of these metals. The metal barrier layer acts to prevent the Cu vapour escaping to poison the Ni-containing anode. However, W, Ta and Nb may oxidize to their oxides at the relatively high operating temperatures of a solid oxide fuel cell even in the relatively low oxygen partial pressures on the fuel side of the fuel cell and/or react with hydrocarbons or $CO_2$ to form carbides, and the Ag layer is provided to alleviate this. The metal or metals of the metal barrier layer and of the outer barrier layer do not react with Ag, but they may react with each other and the Ag is also provided to alleviate this. Ag acts as a catalyst to convert methane to ethane which is not desired, so Ag is not an acceptable outer barrier layer metal. The outer barrier layer is provided to prevent this. Similar protective layers on a Cr-based gas separator are described in our patent application WO97/35349, the contents of which, including any corresponding US patent granted on U.S. patent application Ser. No. 09/155061, are incorporated herein by reference.

Each layer of a multiple layer protective layer preferably has a thickness in the range of 2–3 µm. However, layers in the range of 1–30 µm may be acceptable. Greater thickness than 30 µm may lead to one or more of the multiple layers of the protective layer separating in use due to the different coefficients of thermal expansion of the metals.

Further according to the present invention there is provided a fuel cell stack including at least two planar fuel cells each having a layer of solid oxide electrolyte, an anode layer on one side of the electrolyte layer and a cathode layer on the other side of the electrolyte layer, and a respective gas separator member between the at least two fuel cells, wherein the or each gas separator member is as described above with reference to the first or second aspect of the invention.

The gas separator in accordance with the present invention may have gas channels formed on opposed sides. However, preferably, the gas flow passages are formed in or provided by a mesh or other structure provided between the respective side of the gas separator and the adjacent electrode, for example as described in our patent application WO98/57384. That application discloses, amongst other subject matter, a gas separator plate (referred to therein also as an interconnect plate) formed of heat resistant steel or other material which is internally manifolded. Such a gas separator plate may be modified in accordance with the invention whereby part of the thickness of the gas separator portion is replaced by copper or by a copper-based alloy. The remaining thickness of the gas separator portion may act as the oxidation-resistant layer if it is formed of an appropriate material, such as a heat resistant steel with a surface layer of $Al_2O_3$. Alternatively, the remaining thickness may act as the anode side of the gas separator portion, in which case the oxidation resistant layer will be provided on the opposite, exposed side of the copper or copper-based alloy layer. In this case, the remaining thickness of the gas separator portion, and the manifold portion, may be formed of any suitable material. The copper or copper-based alloy layer may be cast on or otherwise engaged with the remaining thickness of the gas separator portion.

Alternatively, the gas separator member of the invention may be inserted into a corresponding opening through the internally manifolded gas separator plate disclosed in WO 98/57384. The disclosure of WO 98/5784, and of the corresponding U.S. patent applicaion Ser. No. 09/445735, are incorporated in their entirety into this application by reference.

The gas separator may provide a path for drawing electricity from the fuel cell given the high electrical conductivity of copper, but it may be desirable to utilize a separate electrical conductor between the gas separator and the respective electrode, particularly when the layer of oxidation-resistant material and/or any protective layer is formed of an electrically insulating material such as alumina.

Various embodiments of a fuel cell gas separator plate in accordance with the present invention and of a fuel cell assembly incorporating the plate will now be described by way of example only with reference to the accompanying drawings in which.

Figure 1:
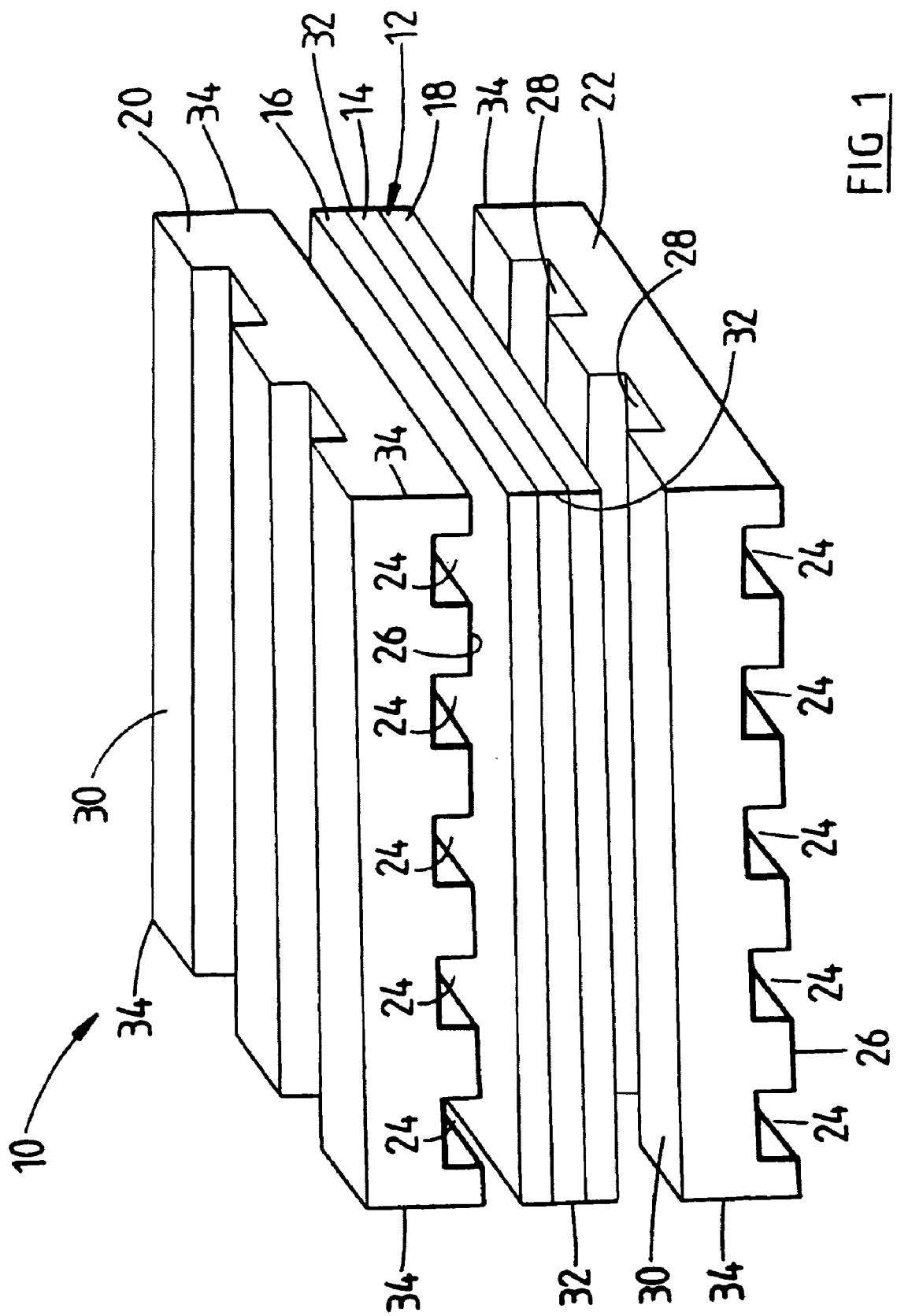
FIG. 1 is a schematic exploded perspective of a fuel cell assembly.

The fuel cell assembly 10 shown in exploded form in FIG. 1 has a typical structure which may be used with a gas separator in accordance with the present invention. As illustrated, the overall structure is known and will therefore not be described in detail. The assembly comprises a planar fuel cell 12 comprising a solid oxide electrolyte central layer 14 with an integral anode layer 16 overlying one face of the electrolyte and an integral cathode layer 18 overlying the opposite face of the electrolyte. The electrode layers may be applied by known screenprinting techniques. The fuel cell is sandwiched between a pair of gas separator plates 20 and 22 which in use are in face to face contact with the anode 16 and cathode 18 respectively.

The gas separator plates 20 and 22 shown in FIG. 1 are identical with an array of gaseous fuel channels 24 extending across the underside 26 and an array of gaseous oxidant flow channels 28 extending across the top side 30. The channels 24 and 28 are shown extending at right angles to each other but they may extend parallel and the respective gas flow directions may then be the same or opposite depending upon the manifolding arrangements. By providing the gas flow channels on both sides, the gas separator plates 20 and 22 may be used to form a fuel cell stack in which an identical fuel cell 12 overlies the gas separator plate 20 and another identical fuel cell 12 underlies the gas separator plate 22. Further identical gas separator plates may then be placed adjacent to the opposite sides of the further fuel cells, and so forth to build up a fuel cell stack of the desired number of fuel cells. The gas separator plates provided at the ends of the stack need only have one of the arrays of gas channels, gas channels 24 for the gas separator plate at the top of the stack as described and gas channels 28 for the gas separator plate at the bottom of the stack as described. Likewise in a fuel cell assembly comprising only a single fuel cell 12 the proposed gas separator plates need only have the respective array of gas channels on the face in contact with the fuel cell. These end gas separator plates are commonly termed end plates.

It will be appreciated that the gas channels on one or both sides of the gas separator plates 20 and 22 may be replaced by a separate gas flow structure, such as a mesh, between the gas separator plate and the respective electrode. Such an arrangement is described in our patent application WO 98/57384.

In use, the gaseous fuel and oxidant flows must be kept apart and suitable manifolding (not shown) is provided to ensure this. In the cross flow arrangement illustrated this is conveniently provided by an inert cylindrical or other sleeve (not shown), for example of ceramic, which extends around the fuel cell stack with its axis normal to the gas flow channels 24 and 28 and with the corners 32 of the fuel cells 12 and the corners 34 of the gas separator plates sealed in contact with the annular inner surface of the sleeve. The fuel cell assembly is completed by terminals on the top and bottom end plates for attachment of the fuel cell or fuel cell stack to an external load.

As noted already, the fuel cell assembly 10 illustrated in FIG. 1 is known and in the described embodiment the fuel cell 12 comprises a solid oxide electrolyte 14 of $Y_2O_3$-doped $ZrO_2$ as an ionic conductor while the electrodes 16 and 18 are at least primarily electronic conductors with the anode 16 comprising an $Ni/ZrO_2$ cermet and the cathode 18 comprising strontium doped lanthanum manganite (LSM).

In a variation, the fuel cell 12 may be replaced by a fuel cell in which the anode layer is the primary load bearing layer, for example as described in the aforementioned patent application WO 98/57384. Other features described in that application, including the proposals for reducing the compressive load on the anode side of the fuel cells, may be adopted for use with the present invention.

The gas separator plates 20 and 22 may be formed of aluminium bronze or of copper or some other suitable copper alloy. In either case the plates 20 and 22 will in use have a layer of $Al_2O_3$ on the cathode side 30 as well as on the anode side 26, at least in the case of the copper plates, if the fuel gas includes methane.

Figure 2:
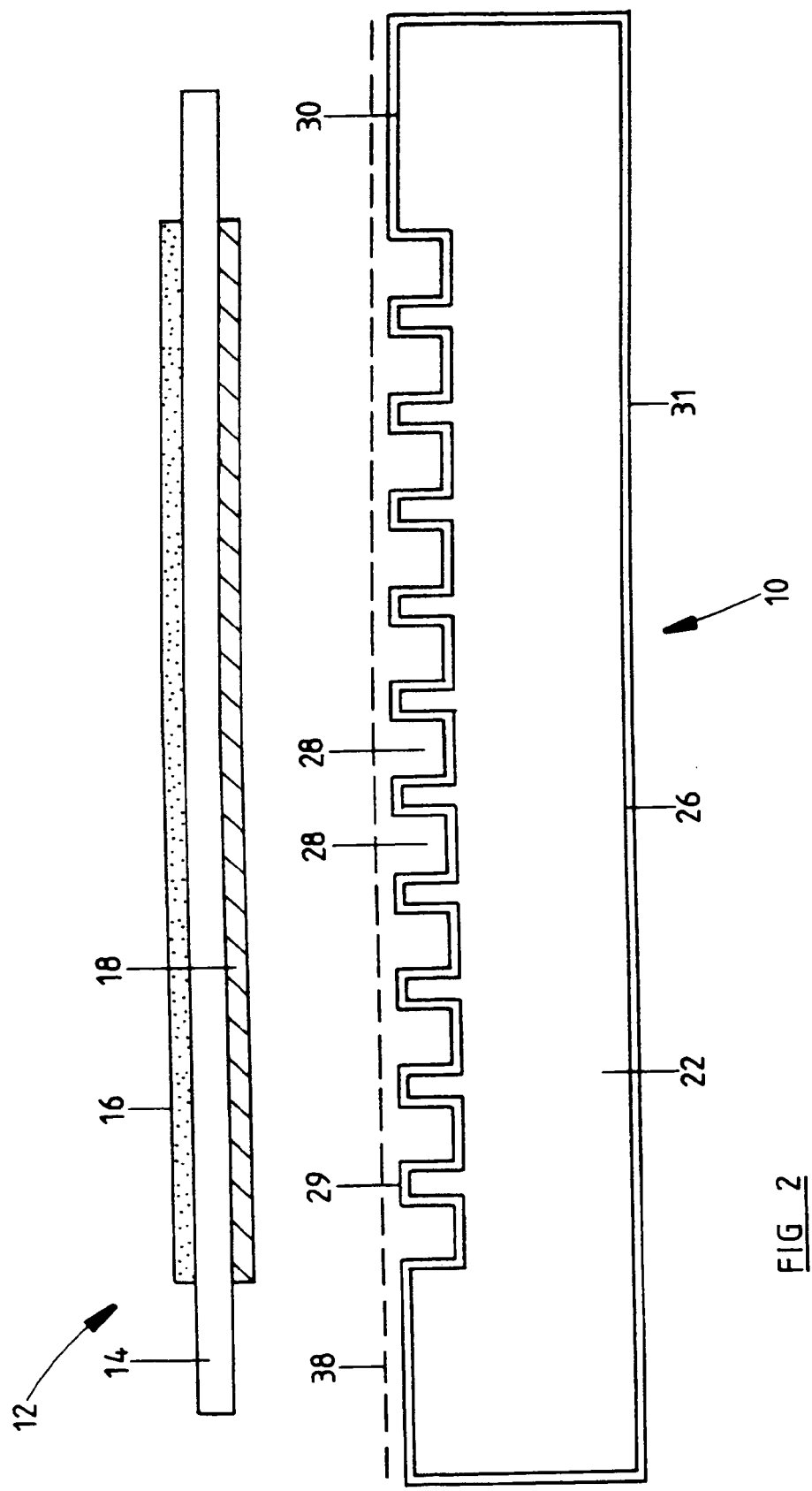
FIG. 2 is a schematic partial side elevational exploded view of a first embodiment of the fuel cell assembly.

Referring to FIG. 2, the gas separator plate 22 is formed of copper metal and has a thickness of about 0.5 mm. On each of the cathode side 30 and the anode side 26 is provided a layer 29 and 31 respectively of self-aluminising steel foil (a heat resistant steel) having a thickness of about 50 µm. The foil layers 29 and 31 are provided by wrapping the entire plate 22 in foil with an overlapped join at the edge faces perpendicular to the sides 30 and 26. In use in an oxidising atmosphere, a layer of alumina will form on the outer surface of the foil to electrically isolate the foil and the plate 22. As an alternative to using foil, the cathode side 30 of the plate may be coated with a dense layer of alumina having a thickness of about 100 µm which is electrically insulating. As with the foil, the alumina layer extends across the outermost surface of the cathode side 30 of the gas separator plate 22 including throughout the oxygen containing gas channels 28. Similarly, an alumina layer having a thickness of about 2 μm is provided on the anode side 26 of the plate 22 throughout the gas channels 24.

In order to collect electricity from the cathode side of the fuel cell 12, a layer of expanded metal silver mesh 36 having a thickness of about 100 μm extends over the cathode side 30 to be sandwiched between the cathode layer 18 and the gas separator plate 22. The mesh 36 permits oxygen-containing gas from the channels 28 to contact the cathode layer 18 and is sufficiently thin to deform under the compressive load of the assembled fuel cell assembly 10 and thereby comply to small surface irregularities in the cathode layer 18 and cathode side 30 of the gas separator plate. Thus, the electrical connection with the cathode layer 18 may be enhanced.

The silver mesh 36 is in electrical contact with platinum collector wires 38 at opposed ends of the mesh leading to an external electrical circuit.

On the anode side 26, a nickel mesh (not shown) is disposed between the gas separator plate 22 and the anode layer 16 of the adjacent fuel cell. The nickel mesh is also in electrical contact with the external electrical circuit.

Figure 3:
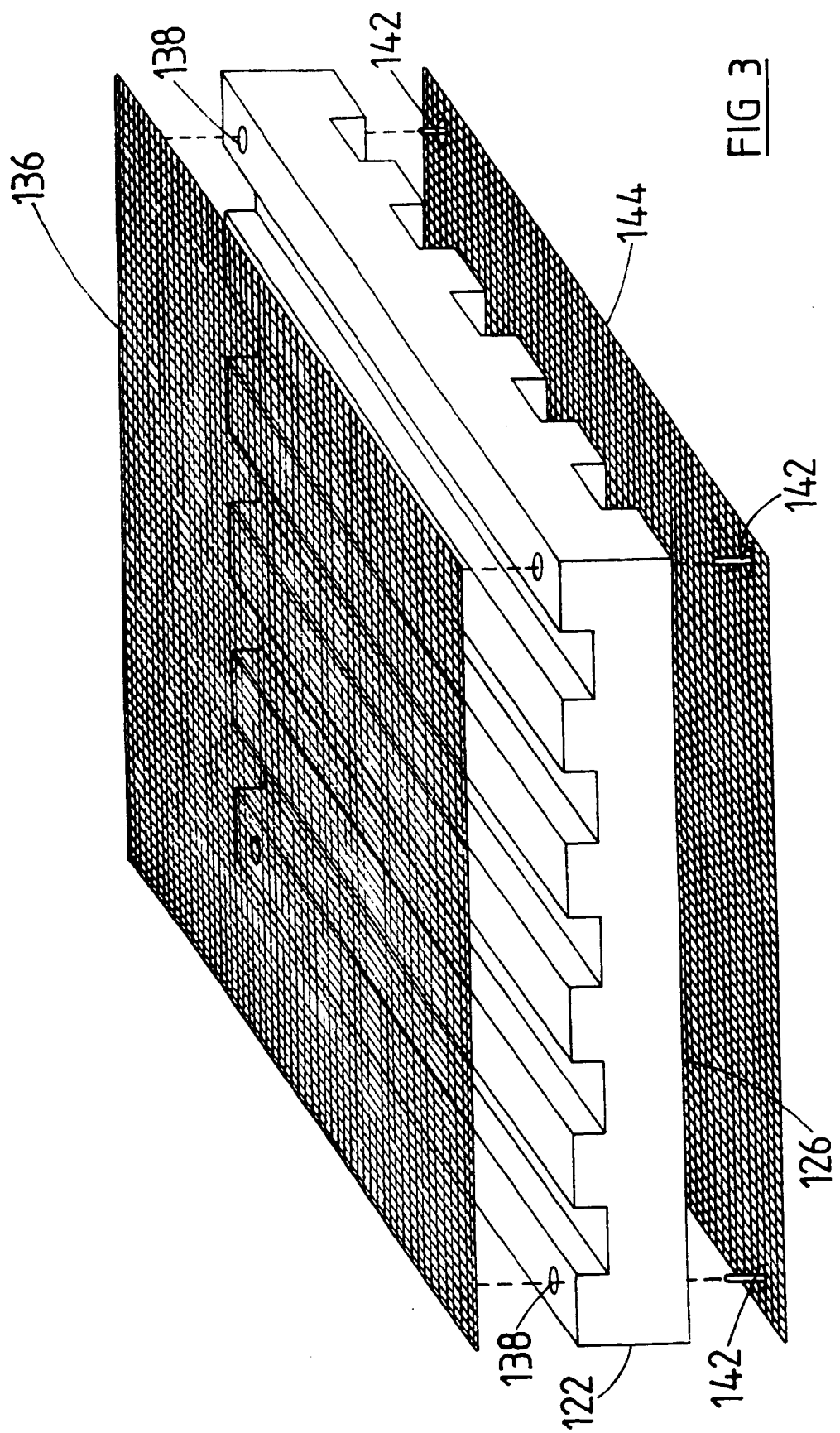
FIG. 3 is an exploded view of a second embodiment of the fuel cell assembly.

Referring to FIG. 3, a gas separator plate 122 has a construction generally the same as gas separator plate 22 shown in FIG. 2, but it formed of aluminium bronze. In use, a layer of $Al_2O_3$ will form on at least the cathode side of the plate 122. A conducting layer 136 on the cathode side is in the form of a woven mesh made from high temperature stainless steel which is silver plated. This mesh is electrically connected to the cathode side of the plate 122 by way of its corners contacting four slightly raised contacts 138. The contacts 138 are the silver plated heads of electrically conducting rivets which pass completely through the thickness of the plate 122 and therefore through the alumina layer formed on the cathode side of the plate. On the anode-facing side 126, the opposite-facing rivet heads 142 are silver or silver-plated or nickel or nickel plated and these clamp a nickel or nickel plated conducting mesh 144 to the anode-facing side of the plate 122. In operation of the fuel cell shown in FIG. 4 the mesh 144 is pressed against the anode side of a fuel cell to make electrical contact therewith. The conduction path thus extends from the cathode side of a first fuel cell to mesh 136, then through the gas separator plate 122 via the four rivets to mesh 144, and from there to the anode side of a second fuel cell. It will be appreciated that this connection path is independent of the existence of the alumina layer or layers on the gas separator plate.

Sealing of the annular clearance between the rivets and holes in the connector plate 122 through which the rivets pass may be accomplished by the rivet heads 138 bearing tightly on the cathode-facing side of plate 122. In addition or alternatively the clearance between the rivets and holes may be sealed with a glass which is viscous at the operating temperature of the gas separator plate.

EXAMPLE

Figure 4:
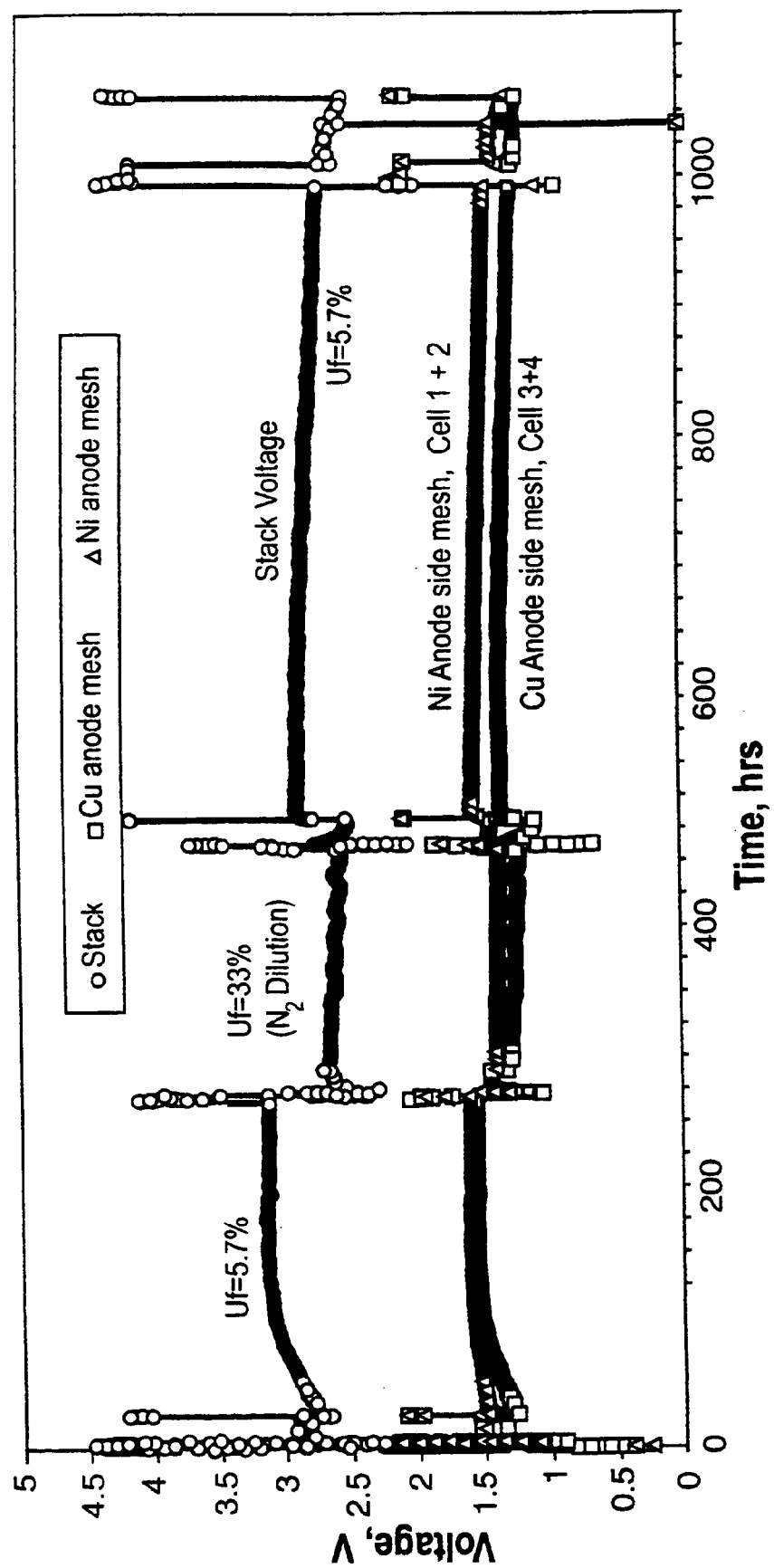
FIG. 4 is a plot of performance showing cell voltage output over a period of about 1030 hours for a fuel cell assembly similar to that described with reference to FIG. 3.

The possibility of using copper as a material for a gas separator in a solid oxide fuel cell assembly was tested over an extended period by verifying whether any contamination of a nickel anode by the copper resulted in substantially reduced performance of the fuel cell assembly. The results, given by way of example only, are shown in FIG. 4.

In the example, a stack of four fuel cell assemblies was formed with each fuel cell assembly being substantially as described with reference to FIG. 3, except that two of the nickel meshes on the anode sides of the fuel cells were each replaced by copper mesh and the silver meshes were each replaced by platinum mesh. However, silver mesh could have been used in place of the platinum mesh. Each fuel cell comprised a solid oxide electrolyte of $Y_2O_3$-doped $ZrO_2$ as an ionic conductor, an anode comprising an $Ni/ZrO_2$ cermet and a cathode comprising strontium doped lanthanum manganite (LSM).

Each gas separator between adjacent fuel cells and adjacent to the two end fuel cells was formed of self-aluminising heat resistant steel with gas channels formed on the side or sides facing the adjacent fuel cell or cells. A platinum mesh with platinum connectors was disposed between the cathode of each fuel cell and the adjacent gas separator, while a nickel mesh was disposed between the anodes of two of the fuel cells and the adjacent gas separators with a copper mesh between the anodes of the other two fuel cells and the adjacent gas separators, with all of the meshes in electrical contact with the adjacent electrodes.

The fuel cells, gas separators and meshes were each 50 mm+50 mm, with the copper mesh being woven and the nickel and platinum meshes being expanded meshes. All of the stainless steel gas separators had alumina coatings on both the anode side and the cathode side. Current take-offs were of platinum wire threaded through holes in the gas separators as described with reference to FIG. 3 or welded to the terminal gas separators or end plates under the seal area. The fuel cell assembly was manifolded to prevent fuel gas and oxygen containing gas leakage and was tested at 900° C., at a current of three amps, with a fuel gas of humidified hydrogen containing 9.5% $H_2O$ and air as the oxygen containing gas.

The voltage was measured across each pair of cells, that is the two cells with the copper anode side current collectors and the two cells with the nickel anode side current collectors. During the test, fuel utilisation (Uf) was tested, that is how much of the fuel gas inputted to the fuel cell stack was used to make electricity, by diluting with nitrogen in order to keep all flow rates and other parameters the same. Nine phases can be identified from the FIG. 4 during the operating of the stack as follows:

Start-up Phase to 4.5 hrs

Phase I: 4.5 hrs to 25 hrs. Continuous operation at 5.5% fuel utilisation.

Phase II: 25 hrs to 260 hrs. Continuous operation at 5.7% fuel utilisation.

Phase III: 260 hrs to 285 hrs. Attempt at higher fuel utilisation through increased moisture.

Phase IV: 285 hrs to 455 hrs. Nitrogen dilution with fuel utilisation at 33%.

Phase V: 458 hrs to 459 hrs. Nitrogen dilution with fuel utilisation at 57 and 48%.

Phase VI: 458.8 hrs to 477.7. Nitrogen dilution with fuel utilisation at 38.6%.

Phase VII: 477.8 hrs to 963 hrs. Condition as Phase II. Continuous operation at 5.7% utilisation.

Phase VIII: 962 hrs to 1009 hrs. Condition as Phase II. Thermal cycle experiment.

Phase IX: 1010 hrs to 1031 hrs. Condition as Phase II. Mechanical load removal.

Shut-down phase.

FIG. 4 shows substantial stability of the voltage output over about 1000 hrs with very little difference between the voltages at the copper and nickel anode side current collectors. This shows that copper, with an oxidation resistant coating on the cathode side, may be used as a gas separator in a fuel cell stack given the advantageous thermal conductivity properties of the metal. Where hydrogen is the fuel gas, no other treatment or protective coating of the copper is required. However, if methane is the fuel gas and nickel the anode material, a protective coating will be required on the anode side of the copper gas separator. Alternatively, some other means will be required to prevent copper vapour escaping from the gas separator, such as alloying with aluminium. Other alloying metals, such as Be, may also provide the same advantage. However, Al is preferred over Be on a cost basis and because the oxide of Be is highly toxic.

A variety of protective coatings on copper or copper alloy sheets have also been tested to determine whether the coatings prevent copper vapour contaminating the nickel in a nickel zirconia cermet such as is used in fuel cell anodes.

In a first test, a protective layer comprising three layers of, respectively, tungsten followed by silver and then nickel were applied to a pure copper sheet. In a second test, a protective layer comprising three layers of, respectively, tantalum followed by silver and then nickel was applied to a similar pure copper sheet. Each of the three layers in each test had a thickness of 2 to 3 microns. In a third test, a similar pure copper sheet was wrapped in a self-aluminising heat resistant steel foil having a thickness of 50 microns. In a fourth test an aluminium bronze sheet was provided with an alumina surface coating by oxidising the sheet in air at 850° C. for two hours.

Each of these protected sheets was then placed face down on a nickel zirconia cermet substrate and weighted to ensure close physical contact between the protective layer of the copper or copper alloy sheet and the anode material. The structure was then heated at 900° C. for one week in purge gas (4% $H_2$ in nitrogen). At the end of the test, each structure was cooled and the nickel zirconia cermet substrates were investigated for copper contamination of the nickel. No such contamination was identified.

Those skilled in the art will appreciate that the invention described herein is susceptible to variations and modifications other than those specifically described. It is to be understood that the invention includes all such variations and modifications which fall within its spirit and scope. The invention also includes all of the steps, features, compositions and compounds referred to or indicated in this specification, individually or collectively, and any and all combinations of any two or more of said steps, features, compositions and compounds.

Throughout this specification and the claims which follow, unless the context requires otherwise, the word "comprise", and variations such as "comprises" and "comprising", will be understood to imply the inclusion of a stated integer or step or groups of integers or steps but not the exclusion of any other integer or step or group of integers or steps.

The invention claimed is:

1. A planar fuel cell stack including at least two planar solid oxide fuel cells each having a layer of solid oxide electrolyte, an anode layer on one side of the electrolyte layer and a cathode layer on the other side of the electrolyte layer, and a gas separator member between the at least two fuel cells, wherein the gas separator member has an anode side and a cathode side and comprises a layer consisting of copper or of copper-based alloy containing at least 50 wt % Cu, a layer of oxidation-resistant material on the cathode side of the copper or copper-based alloy layer and a protective layer on the anode side of the cooper or copper-based alloy layer to prevent Cu vapour escaping from the anode side of the gas separator member at the operating temperature of the stack, wherein the oxidation resistant material of the gas separator member comprises $Al_2O_3$ applied to the layer of copper or copper-based alloy as an aluminium coating which is subsequently oxidised, and wherein the aluminium coating is at least partly diffused into a cathode-side surface portion of the layer of copper or copper-based alloy prior to being oxidised.

2. A planar fuel cell stack according to claim 1 wherein the layer of copper or copper-based alloy of the gas separator member has a thickness in the range of from about 0.1 mm to about 4 mm.

3. A planar fuel cell stack according to claim 2 wherein the layer of copper of the gas separator member has a thickness in the range of from about 0.1 mm to about 1 mm.

4. A planar fuel cell stack according to claim 1 wherein the copper-based alloy of the gas separator member comprises copper alloyed with up to a maximum of 50 wt % of one or more alloying elements selected from the group consisting of Al, Ni, Zn, Sn, Fe, Be, Ag, Au, Mn, Si, P, and Pb.

5. A planar fuel cell stack according to claim 1 wherein the layer of oxidation resistant material on the gas separator member has a thickness in the range of about 50 to about 1000 microns.

6. A planar fuel cell stack including at least two planar solid oxide fuel cells each having a layer of solid oxide electrolyte, an anode layer on one side of the electrolyte layer and a cathode layer on the other side of the electrolyte layer, and a gas separator member between the at least two fuel cells, wherein the gas separator member has an anode side and a cathode side and comprises a layer of copper or of copper-based alloy containing at least 50 wt % Cu, a layer of oxidation-resistant material on the cathode side of the copper or copper-based alloy layer and a protective layer on the anode side of the copper or copper-based alloy layer to prevent Cu vapor escaping from the anode side of the gas separator member at the operating temperature of the stack, wherein the protective layer of the gas separator member is of heat resistant steel.

7. A planar fuel cell stack according to claim 6 wherein the layer of oxidation resistant material on the gas separator member is selected from the group consisting of a foil attached to the layer of copper or copper-based alloy, a coating on the layer of copper or copper-based alloy and a substrate onto which the layer of copper or copper-based alloy is coated.

8. A planar fuel cell stack according to claim 7 wherein the layer of oxidation-resistant material on the gas separator member is a foil or a substrate and comprises a heat resistant steel.

9. A planar fuel cell stack according to claim 8 wherein the heat resistant steel is coated with alumina on the cathode side of the gas separator member.

10. A planar fuel cell stack according to claim 8 wherein the heat resistant steel contains at least 4 wt % aluminium and forms a surface layer of alumina on the gas separator member at least at the operating temperature of the fuel cell stack.

11. A planar fuel cell stack according to claim 7 wherein the layer of copper or copper-based alloy of the gas separator member is coated with plural layers on the cathode side which together form the layer of oxidation-resistant material.

12. A planar fuel cell stack according to claim 7 wherein the oxidation resistant material of the gas separator member comprises $Al_2O_3$ applied to the layer of copper or copper-based alloy as an alumina coating.

13. A planar fuel cell stack according to claim 7 wherein the oxidation resistant material of the gas separator member comprises $Al_2O_3$ applied to the layer of copper or copper-based alloy as an aluminium coating which is subsequently oxidised.

14. A planar fuel cell stack according to claim 6 wherein the heat resistant steel of the protective layer of the gas separator member is in the form of a foil.

15. A planar fuel cell stack according to claim 1 wherein the protective layer of the gas separator member comprises $Al_2O_3$ applied to the layer of copper or copper-based alloy as an alumina coating.

16. A planar fuel cell stack according to claim 1 wherein the protective layer of the gas separator member comprises $Al_2O_3$ applied to the layer of copper or copper-based alloy as an aluminium coating which is subsequently oxidised.

17. A planar fuel cell stack including at least two planar solid oxide fuel cells each having a layer of solid oxide electrolyte, an anode layer on one side of the electrolyte ayer and a cathode layer on the other side of the electrolyte layer, and a gas separator member between the at least two fuel cells, wherein the gas separator member has an anode side and a cathode side and comprises a layer consisting of copper or of copper-based alloy containing at least 50 wt % Cu, a layer of oxidation-resistant material on the cathode side of the copper or copper-based alloy layer and a protective layer on the anode side of the copper or copper-based alloy layer to prevent Cu vapour escaping from the anode side of the gas separator member at the operating temperature of the stack, wherein the protective layer of the gas separator member comprises $Al_2O_3$ applied to the layer of copper or copper-based alloy as an aluminium coating which is subsequently oxidised, and wherein the aluminium coating is at least partly diffused into an anode-side surface portion of the layer of copper or copper-based alloy of the gas separator member prior to being oxidised.

18. A planar fuel cell stack according to claim 1 wherein the protective layer of the gas separator member is made up of plural layers, namely a metal barrier layer applied to the layer of copper or copper-based alloy and formed of a material selected from the group consisting of W, Ta, Nb and an alloy of one or more of said metals which does not dissolve into the layer of copper or copper-based alloy, an intermediate layer of Ag on the metal barrier layer, and a barrier layer on the intermediate layer formed of a metal selected from the group consisting of Ni, a noble metal except Ag and an alloy of one or more of Ni and noble metals except Ag.

19. A planar fuel cell stack including at least two planar solid oxide fuel cells each having a layer of solid oxide electrolyte, an anode layer on one side of the electrolyte layer and a cathode layer on the other side of the electrolyte layer, and a gas separator member between the at least two fuel cells, wherein the gas separator member has an anode side and a cathode side and comprises a layer of aluminium bronze, a layer of alumina on the cathode side of the layer of aluminium bronze to provide oxidation resistance and a protective layer of alumina on the anode side of the layer of aluminium bronze to prevent Cu vapour escaping from the anode side of the gas separator member at the operating temperature of the stack.

20. A planar fuel cell stack according to claim 19 wherein the aluminium bronze of the gas separator member contains at least 5 wt % Al.

21. A planar fuel cell stack according to claim 19 wherein the gas separator member has a thickness in the range of from about 1 mm to about 4 mm.

22. A planar fuel cell stack according to claim 4 wherein the copper is alloyed with up to a maximum of about 20 wt % of said one or more alloying elements.

23. A planar fuel cell stack according to claim 6 wherein the heat resistant steel of the protective layer of the gas separator member has a surface layer of alumina on the anode side of the gas separator member.

24. A planar fuel cell stack according to claim 23 wherein the heat resistant steel of the protective layer of the gas separator member contains at least 4 wt % aluminium.

25. A planar fuel cell stack according to claim 6 wherein the layer of copper or copper-based alloy of the gas separator member has a thickness in the range of from about 0.1 mm to about 4 mm.

26. A planar fuel cell stack according to claim 25 wherein the layer of copper of the gas separator member has a thickness in the range of from about 0.1 mm to about 1 mm.

27. A planar fuel cell stack according to claim 6 wherein the copper-based alloy of the gas separator member comprises copper alloyed with up to a maximum of 50 wt % of one or more alloying elements selected from the group consisting of Al, Ni, Zn, Sn, Fe, Be, Ag, Au, Mn, Si. P, and Pb.

28. A planar fuel cell stack according to claim 6 wherein the layer of oxidation resistant material on the gas separator member has a thickness in the range of about 50 to about 1000 microns.

29. A planar fuel cell stack according to claim 13 wherein the aluminium coating is at least partly diffused into a cathode-side surface portion of the layer of copper or copper-based alloy prior to being oxidised.

30. A planar fuel cell stack according to claim 27 wherein the copper is alloyed with up to a maximum of about 20 wt % of said one or more alloying elements.

31. A planar fuel cell stack according to claim 17 wherein the layer of copper or copper-based alloy of the gas separator member has a thickness in the range of from about 0.1 mm to about 4 mm.

32. A planar fuel cell stack according to claim 31 wherein the layer of copper of the gas separator member has a thickness in the range of from about 0.1 mm to about 1 mm.

33. A planar fuel cell stack according to claim 17 wherein the copper-based alloy of the gas separator member comprises copper alloyed with up to a maximum of 50 wt % of one or more alloying elements selected from the group consisting of Al, Ni, Zn, Sn, Fe, Be, Ag, Au, Mn, Si. P, and Pb.

34. A planar fuel cell stack according to claim 17 wherein the layer of oxidation resistant material on the gas separator member has a thickness in the range of about 50 to about 1000 microns.

35. A planar fuel cell stack according to claim 17 wherein the layer of oxidation resistant material on the gas separator member is selected from the group consisting of a foil attached to the layer of copper or copper-based alloy, a coating on the layer of copper or copper-based alloy and a substrate onto which the layer of copper or copper-based alloy is coated.

36. A planar fuel cell stack according to claim 35 wherein the layer of oxidation-resistant material on the gas separator member is a foil or a substrate and comprises a heat resistant steel.

37. A planar fuel cell stack according to claim 36 wherein the heat resistant steel is coated with alumina on the cathode side of the gas separator member.

38. A planar fuel cell stack according to claim 36 wherein the heat resistant steel contains at least 4 wt % aluminium and forms a surface layer of alumina on the gas separator member at least at the operating temperature of the fuel cell stack.

39. A planar fuel cell stack according to claim 35 wherein the layer of copper or copper-based alloy of the gas separator member is coated with plural layers on the cathode side which together form the layer of oxidation-resistant material.

40. A planar fuel cell stack according to claim 33 wherein the copper is alloyed with up to a maximum of about 20 wt % of said one or more alloying elements.

41. A planar fuel cell stack according to claim 1 wherein the protective layer of the gas separator member is of heat resistant steel.

42. A planar fuel cell stack according to claim 41 wherein the heat resistant steel of the protective layer of the gas separator member is in the form of a foil.

43. A planar fuel cell stack according to claim 18 wherein the aluminium coating is at least partly diffused into an anode-side surface portion of the layer of copper or copper-based alloy of the gas separator member prior to being oxidised.

44. A planar fuel cell stack according to claim 41 wherein the heat resistant steel of the protective layer of the gas separator member has a surface layer of alumina on the anode side of the gas separator member.

45. A planar fuel cell stack according to claim 44 wherein the heat resistant steel of the protective layer of the gas separator member contains at least 4 wt % aluminium.

* * * * *